Oct. 25, 1960
M. J. MARTENS
2,957,698
MATERIAL UNLOADER OF FLAIL TYPE WITH
SELECTIVE DRIVE MEANS
Filed Oct. 13, 1958
2 Sheets-Sheet 1
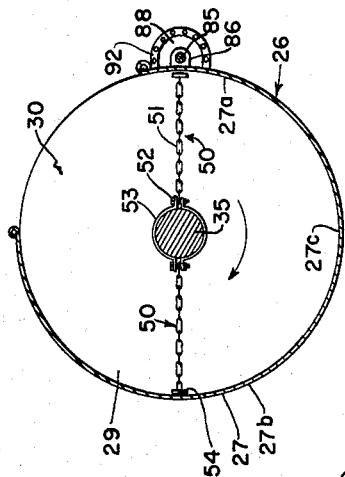
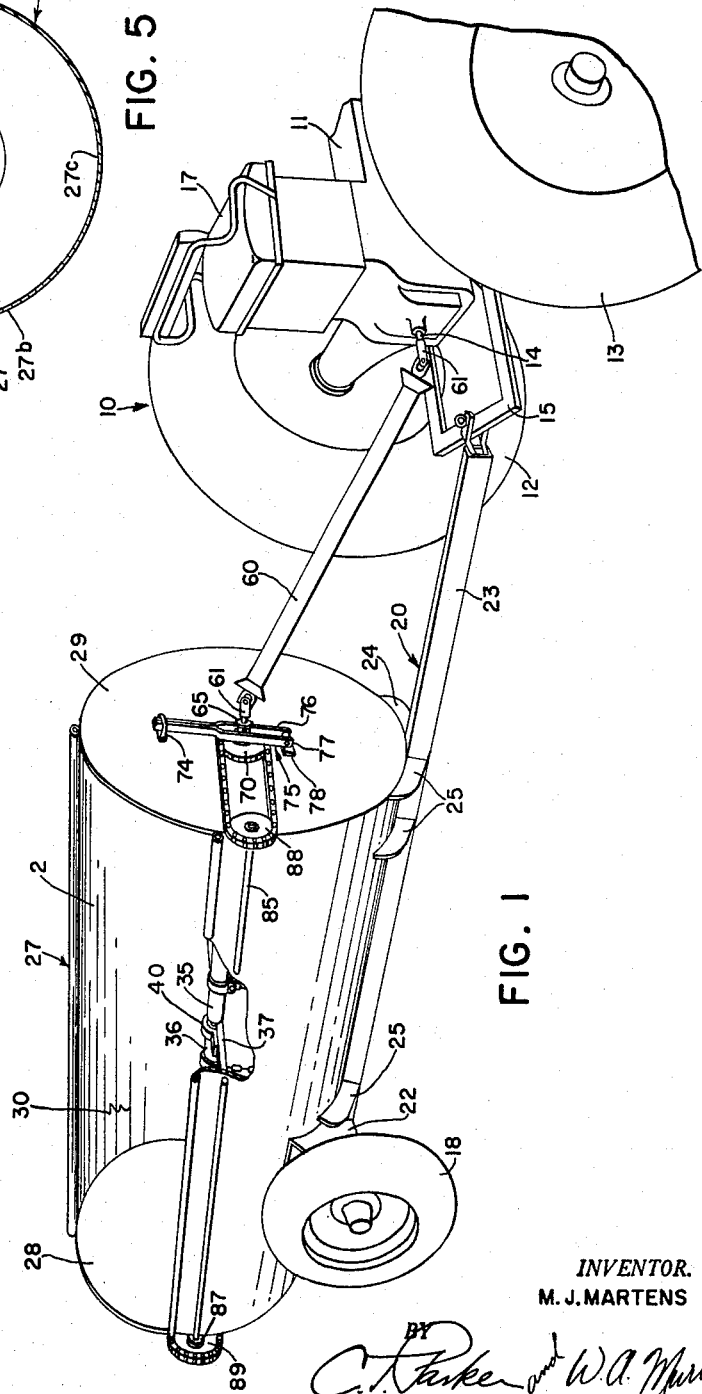
INVENTOR.
M. J. MARTENS
BY
C. T. Parker and W. A. Murray
ATTORNEYS

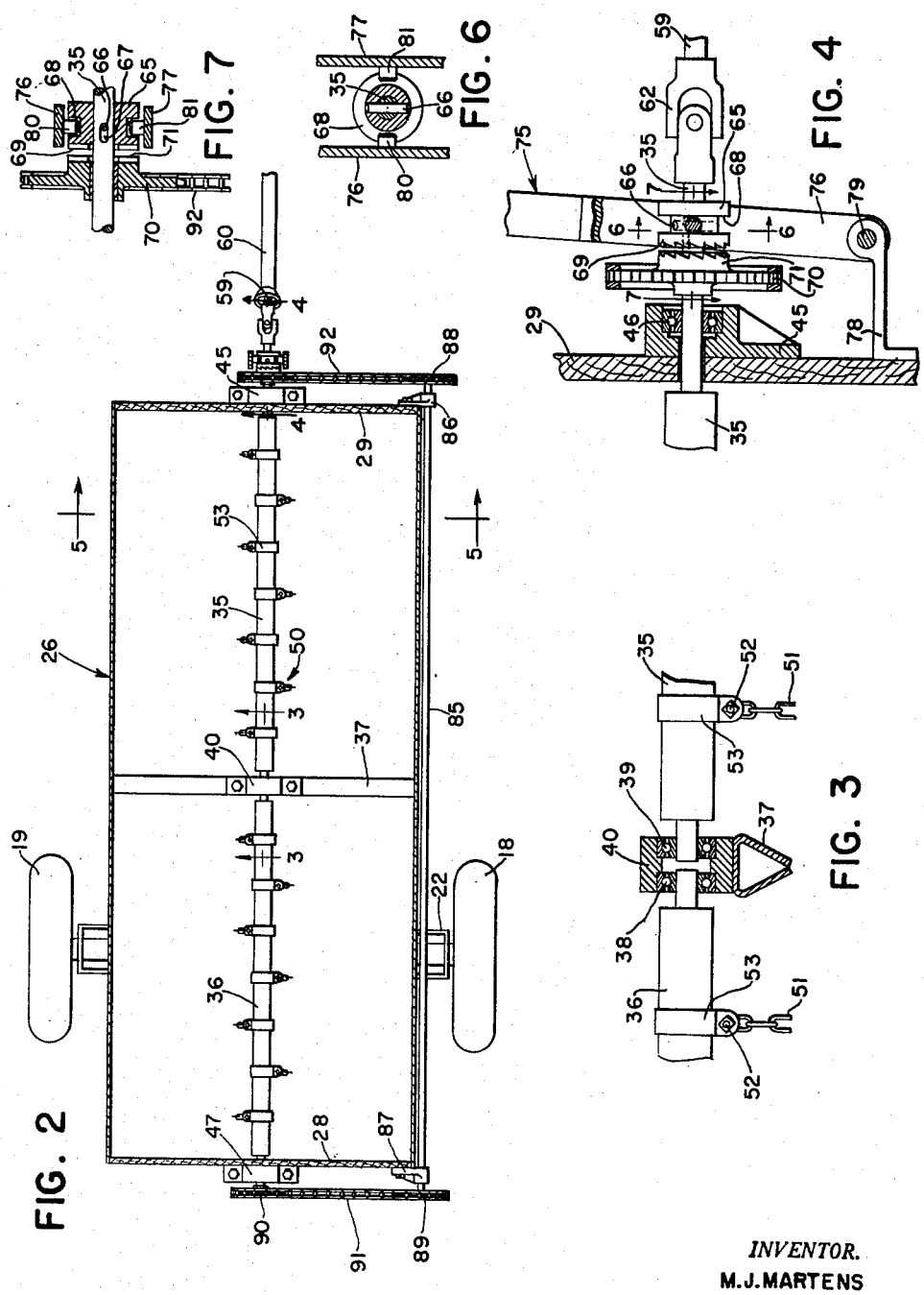

United States Patent Office 2,957,698
Patented Oct. 25, 1960

2,957,698

MATERIAL UNLOADER OF FLAIL TYPE WITH SELECTIVE DRIVE MEANS

Maurice J. Martens, East Moline, Ill., assignor to Deere & Company, Moline, Ill., a corporation of Delaware Filed Oct. 13, 1958, Ser. No. 766,799

9 Claims. (Cl. 275—3)

This invention relates to a material unloading implement. Still more particularly this invention relates to a manure spreader of a new and novel design and its associated selective drive mechanism.

Present day conventional manure spreaders feature a box-type body having a material conveyor moving over its bottom to feed manure or like material rearwardly to rear mounted beaters and widespread members from where it is fed from the rear of the spreader. In this type of spreader considerable expense is required to build and maintain the drive mechanisms which operate the floor conveyor, the beaters, and the widespreads. Since the spreader is normally operated from the power take-off shaft on a tractor, the overall capacity of the spreader is limited so as to not overload the power take-off shaft. Also, it is often difficult due to the inherent characteristics of the material, to evenly distribute manure in a completely pulverized or reduced state which is the desired manner of distribution.

In the U.S. Patent No. 2,886,332 of Keith D. Elwick, issued May 12, 1959 there is therein described a material unloading implement of a nature considerably different than the above-described manure spreader. In that structure there is provided a main frame supporting an elongated material container having a partial cylindrical body. Supported on the container is a longitudinal shaft concentric with the axis of the cylindrical container. Axially spaced on the shaft are a series of flexible arms which operate, upon rotation of the shaft to feed material over one side of the material container and onto the ground.

There are considerable advantages to the type of mechanism shown and described in the Elwick patent. One of the primary advantages is that the flexible arms operate as beaters to completely pulverize the material as it is discharged. Also of value is the simplicity of the unloading implement which reduces the overall manufacturing cost as well as the maintenance cost of the unit. Further, it has been found that the Elwick type of material unloader is more efficiently operated inasmuch as there is required only a single drive unit and only a single driven element for the entire unloader.

One of the drawbacks of the aforedescribed type of unloader is that by placing the flexible arm elements axially along the shaft so as to unload material throughout the container, there is normally a very large initial load on the power take-off shaft and, depending upon the type of material to be unloaded, there may be a considerably large load on the power take-off shaft throughout the operation. The large initial load on the shaft is caused by the condition which arises due to the fact that the flexible arms must be drawn from an immobile state through the material. Since there are normally provided drags on the ends of the flexible arms, a large resistance is caused by the material to initial movement of the flexible arms. It is therefore one of the main objects of this invention to provide a simple mechanism for reducing the initial load on the power take-off shaft as well as reducing the load on the shaft throughout its operation.

Specifically, it is desired to provide longitudinal shaft means extending the length of the material containing or cylindrical body which features a pair of axially alined shafts disposed in the container in end to end relation, with the adjacent ends of the shafts being supported from the sides of the cylindrical body and the opposite ends of the shafts being supported by the ends of the body. It is also proposed to use drive means which are adjustable to drive either one or both of the pair of shafts as it is desired. By this arrangement, the flexible arm elements on one of the pair of shafts may operate to unload only half of the container prior to the drive means being adjusted to drive the other shaft by which the other half of the container will be unloaded. As is obvious, therefore, the initial torque as well as the overall torque throughout the unloading operation will be reduced at least fifty percent. Also, by an arrangement of this manner, a relatively small tractor may be utilized as the power source for a comparatively large capacity material unloader.

Generally, it is proposed and is an object of this invention to provide an improvement for the Elwick type spreader which features the centrally positioned arm carrying shaft means to be divided into a plurality of axially alined shafts which are mounted end to end, each shaft of which is permitted or is capable of being driven to the exclusion of the other shafts. In this manner, sections of the material container will be unloaded to the exclusion of other sections.

Other objects and advantages of the present invention will become apparent to those skilled in the art as the nature of the invention is better understood following the description as set forth in the specification and as shown in the accompanying drawings.

Fig. 1 is a front and side perspective of the material unloading implement and a rear portion of the tractor.

Fig. 2 is a sectional plan view of the material unloading implement taken substantially through the axis of the main shaft means.

Fig. 3 is an enlarged sectional view taken substantially along the line 3—3 of Fig. 2.

Fig. 4 is an enlarged sectional view taken substantially along the line 4—4 of Fig. 2.

Fig. 5 is a sectional view taken substantially along the line 5—5 of Fig. 2.

Fig. 6 is a sectional view taken substantially along the line 6—6 of Fig. 4.

Fig. 7 is a sectional view taken substantially along the line 7—7 of Fig. 4.

Referring now to Fig. 1, the tractor 10 is of conventional design having an elongated body 11 supported at its forward end by front steerable wheels, not shown, and at its rear by rear traction wheels 12, 13. The tractor 10 is characterized by having a conventional power take-off shaft 14 extending rearwardly from the tractor body 11 and a drawbar 15 fixed to the underside of the body 11. The tractor is opened from an operator's station indicated by the seat 17, with the control levers for operating the power take-off shaft 14 and other mechanisms of the tractor being available at that station.

The material unloader or manure spreader includes an elongated main frame or chassis 20 supported at its rear end by a pair of transport wheels 18, 19, mounted on a transverse axle structure 22. Extending forwardly from the axle structure 22 is an elongated channel member 23 having left and right hand arcuate shaped rib members 24, 25 respectively extending outwardly from opposite sides thereof. The ribs 24, 25 extend under and operate in conjunction with the channel member 23 to cradle or support an elongated fore-and-aft extending material containing body, indicated in its entirety by the reference numeral 26. As may be seen clearly in Figs. 1 and 5, the material containing body 26 includes an elongated partial cylindrical shaped shell 27 enclosed at opposite ends by end walls or plates 28, 29. As will later become apparent, a material discharge outlet 30 is provided in the body by elimination of the upper right hand section of the shell 27. Consequently, the discharge outlet 30 extends the longitudinal dimension of the material containing body 26.

The cylindrical shell may be treated as a U-shaped member having the opposite side walls 27a, 27b connected by a bottom wall 27c. The side wall 27b extends upwardly beyond the upper edge of the wall 27a so as to prevent material from flowing over that side of the container. Positioned internally and substantially on the axis of the partial cylindrical shell 27 is shaft means in the form of a pair of axially alined shafts 35, 36 positioned in end to end relation with each of the shafts 35, 36 extending substantially half the length of the container 26. The shafts 35, 36 are supported at their adjacent ends by means of structure including a transverse and horizontally disposed triangular shaped bar 37 centrally positioned relative to the end walls 28, 29. The bar 37 is rigidly fixed to the side walls 27a, 27b at its opposite ends. Supported on the cross bar 37 are a pair of bearings 38, 39 in which are journaled the ends of the shafts 35, 36. A bearing housing 40 is provided to encase both bearings 38, 39. The shaft 35 is supported at its forward end by means of the front wall 29 which supports a bearing housing 45 in which is mounted a bearing 46 which journals the forward end of the shaft 35. The rear end of the shaft 36 is supported in the rear end wall 28 in a similar manner or specifically by means of a bearing housing 47 which carries a bearing, not shown, for supporting the shaft 36. Axially spaced on the shafts 35, 36 are a plurality of flexible arm elements 50 composed of a series of link chains 51 connected at their ends to the shafts 35 or 36 by means of bolts 52 carried on metal straps or rings 53 which are fixed to shafts 35, 36. As may be seen from viewing Figs. 3 and 6, the bolts 52 operate to both tighten the straps 53 on the shafts 35, 36 as well as mount the chains 51 on the straps 53. On the outer ends of the chains 51 are a series of drag members 54 which are suitably connected to the chains.

The drive means for effecting rotation of the shafts 35, 36 receives its power from the power take-off shaft 14 on the tractor 10 and includes a power shaft 59 mounted under protective shielding 60 which is connected at its forward end, by means of a universal joint 61, to the power take-off shaft 14 and at its rear end by means of a universal joint 62 to a forward extension of the shaft 35. Also mounted on the forward end of the shaft 35 is a driven annular element 65 which is keyed, as at 66, to the shaft 35, the shaft 35 having an axial slot 67 permitting the driven element to be moved fore-and-aft on the shaft 35. The element 65 is characterized by having an annular groove 68 and a rearwardly facing toothed surface 69. Just rearwardly of the driven element 65 is a sprocket 70 which is also mounted on the forward end of the shaft 35 for relative rotation thereto. The hub of the sprocket 70 has a forwardly facing toothed surface 71 which is engageable with the toothed surface 69 on the driven element 65. As is clearly evident, the sprocket 70 is driven by means of the driven annular element 65 upon the toothed surfaces 69, 71 being engaged with one another.

The driven element 65 is moved axially along the shaft 35 by means of an inverted Y-shaped lever 75 having bifurcated leg portions 76, 77 on opposite sides of the driven element 65. The leg portions 76, 77 are pivotally mounted at their lower ends on the forward wall 29 by means of a bracket 78. Direct connection between the leg portions 76, 77 and the bracket 78 is by means of the pivot pin 79. Fixed to the inner surfaces of the leg portions 76, 77 and adjacent to the driven element 65 are a pair of inwardly extending lugs 80, 81 which fit in the groove 68 of the driven element 65. The lugs 80, 81 permit free rotation of the driven element 65 relative to the lugs. However, the lugs 80, 81 will permit the lever 75 to move the driven annular element 65 into engagement with the sprocket 70 to effect rotation of the sprocket in unison with the driven element 65 and shaft 35. Consequently the lever 75 and driven element 65 operate as control mechanism for selectively effecting rotation either individually or in unison of the shaft 35 or the sprocket 70 which, in effect, controls the rear shaft 36. As may be seen in Fig. 1, a link 74 is mounted on the front face of the wall 29 for purposes of locking the lever 75 and preventing disengagement of the teeth 69, 71 when the lever 75 is swung rearwardly.

The rear shaft 36 is rotated by drive means extending from the sprocket 70. The latter drive means includes a fore-and-aft extending shaft 85 journaled, as at 86, 87 to the front and rear walls 29, 28 respectively. The shaft 85 is disposed externally of the cylindrical shell 27 and is substantially the length of the material containing body, opposite ends thereof extending slightly beyond the end walls 28, 29. Mounted on the forward end of the shaft 85 is a sprocket 88 and on the rear end a sprocket 89. Alined transversely with the rear sprocket 89 and mounted on the rear end of a shaft 36 is a driven sprocket 90. The sprockets 89, 90 are connected by a drive chain 91, the sprockets 89, 90 and chain 91 thereby effecting a chain drive between the drive shaft 85 and the rear shaft 36. The drive shaft 85 is driven by means of a chain 92 which is mounted over the front sprocket 88 and receives its power from the sprocket 70.

The material unloader will operate in the following manner. When it is desired to unload the container 26, the lever 75 may be moved into a position in which teeth 69 and 70 are in engagement thereby effecting rotation of both the front and rear shafts 35 and 36 respectively so as to cause material to be driven from the container by the chains 51 and the associated drags 54 on the ends of the chains. In actual operation, upon initial movement of the shafts 35, 36 the chains will first wrap themselves around the shafts so as to permit the drags 54 to clear the area next adjacent to the shafts. As that area is cleared, the chains will tend to extend by centrifugal force and will continue to extend until they are completely extended or are in a position as shown in the Fig. 5. The direction of rotation will be clockwise, as viewed in Fig. 5, and will operate to throw the material over the side wall 27a and through the discharge opening 30.

In many instances due to the weight of the material or possibly the moisture content of the material there will exist conditions in which the starting load required to rotate the shaft and to drag the chains through the material in its initial stages as well as possibly all other stages of unloading, a resulting overload on the drive or power take-off shaft 14 will exist. By disengaging the teeth 68 of the driven element 65 from the teeth 69 on the hub of the sprocket 70, only the forward shaft 35 will be driven and consequently only the forward half of the container will be emptied. In the latter circumstance, upon the forward half of the container being emptied, the lever 75 may then be moved to cause engagement between the driven element 65 and the sprocket 70 which will effect rotation of the rear shaft 36. This will cause the rear half of the container to be emptied. Should material overflow or be caused to pass into the forward half of the container, the shaft 35 and its associated chains and drags will maintain the forward end of the container free of material. Obviously, since only half of the container is being cleared at one instance, the resultant load on the power take-off shaft 14 is approximately half of what it would be if the entire length of the container was unloaded. Consequently, the overall load on the power take-off shaft will be reduced to a condition in which a smaller tractor may be used, or a larger capacity unloader may be used.

While only one form of the invention has been shown, it should be recognized that other forms and variations of the invention will undoubtedly occur to those skilled in the art. Therefore, while the structure was herein described in specific and detailed nature, it was not the intention in so describing it to limit or narrow the invention beyond the broad concepts set forth in the appended claims.

What is claimed is:

1. A material unloader comprising: an elongated material containing body, having longitudinally extending upwardly opening discharge outlet; longitudinally extending shaft means rotatably mounted within said body including a plurality of axially alined shafts disposed end to end; radially extending arm elements mounted on and axially spaced along the shafts; and drive means effecting rotation of the shaft means to cause the arm elements to discharge material through the discharge outlet; and control mechanism for said drive means adjustable to effect rotation of the shafts individually or in unison.

2. The invention defined in claim 1 in which the material containing body is formed of a partial cylindrical shell closed at opposite ends and formed about the shaft means, and the material discharge outlet is effected by elimination of a section of the shell above and generally to one side of the shaft means.

3. The invention defined in claim 2 in which the shaft means includes a pair of shafts positioned end to end and supported at adjacent ends by structure extending from the partial cylindrical shell and supported at opposite ends by the respective opposite ends of the material containing body.

4. The invention defined in claim 3 in which the drive means includes a main power source; means connecting the power source to one of said opposite ends of one of said shafts for effecting rotation thereof, means connecting the power source to said opposite end of the other of said shafts including a longitudinally extending shaft mounted externally of the partial cylindrical shell; and control mechanism for said latter means selectively adaptable to effect rotation of the other of said shafts.

5. A material unloader comprising: an elongated material containing body having a longitudinal extending upwardly opening discharge outlet; longitudinally extending shaft means rotatably mounted within said body including a plurality of shafts rotatable about an axis extending substantially the length of the body; radially extending arm elements mounted on and axially spaced along the shafts; and drive means effecting rotation of the shaft means to cause the arm elements to discharge material through the discharge outlet; and control mechanism for said drive means adjustable to effect rotation of the shafts individually or in unison.

6. A material unloading implement attachable to a tractor having a power take-off shaft and an implement connecting means, comprising: a mobile implement frame having front and rear ends and attachable at its front end to the implement connecting means; a material container mounted on the frame having an elongated body portion of U-shaped cross section including transversely spaced side walls and opposite end walls closing the ends of the body portion; longitudinally extending shaft means located between the side walls and extending between the end walls including a pair of axially alined shafts positioned end to end; structure on the body portion rotatably supporting adjacent ends of the shafts; means on the end walls rotatably supporting respective opposite ends of the shafts; a longitudinal drive shaft substantially parallel to the aforesaid axis of the shaft means supported externally of the body portion, said drive shaft being substantially the length of the body portion; drive means having control mechanism therein connected to said power take-off shaft adjacent one of said end walls for selectively effecting rotation of the drive shaft and the shaft of said pair of shafts adjacent the latter end wall; means extending between the drive shaft and other of said pair of shafts for effecting rotation of the latter; and extensible arm means axially spaced on the pair of shafts effective upon rotation of the shafts to discharge material over the side walls.

7. A material unloading implement attachable to a tractor having a power take-off shaft and an implement connecting means, comprising: a mobile implement frame having front and rear ends and attachable at its front end to the implement connecting means; a material container mounted on the frame having an elongated body portion of U-shaped cross section including transversely spaced side walls and opposite end walls closing the ends of the body portion; longitudinally extending shaft means located between the side walls and extending between the end walls including a pair of axially alined shafts positioned end to end; structure on the body portion rotatably supporting adjacent ends of the shafts; means on the end walls rotatably supporting respective opposite ends of the shafts; a longitudinal drive shaft substantially parallel to the aforesaid shaft means supported on the body portion; drive means connected to said power take-off shaft adjacent one of said end walls effecting rotation of the drive shaft and the shaft of said pair of shafts adjacent the latter end wall, said drive means having control mechanism therein selectively adaptable to effect rotation of one or both thereof; means extending between the drive shaft and other of said pair of shafts for effecting rotation of the latter; and extensible arm means axially spaced on the pair of shafts effective upon rotation of the shafts to discharge material over the side walls.

8. A material unloading implement attachable to a tractor having a power take-off shaft and an implement connecting means, comprising: a mobile implement frame having front and rear ends and attachable at its front end to the implement connecting means; a material container mounted on the frame having an elongated body portion of U-shaped cross section including transversely spaced side walls and opposite end walls closing the ends of the body portion; longitudinally extending shaft means located between the side walls and extending between the end walls including a plurality of axially alined shafts positioned end to end; structure on the body portion rotatably supporting the shafts; a longitudinal drive shaft substantially parallel to the aforesaid shaft means supported on the body portion; drive means connected to said power take-off shaft adjacent one of said end walls effecting rotation of the drive shaft and the shaft of said plurality of shafts adjacent the latter end wall, said drive means having control mechanism therein selectively adaptable to effect rotation of one or both thereof; means extending between the drive shaft and the other of said plurality of shafts for effecting rotation of the latter; and extensible arm means axially spaced on the plurality of shafts effective upon rotation of the shafts to discharge material over at least one of the side walls.

9. A material unloading implement attachable to a tractor having a power take-off shaft and an implement connecting means, comprising: a mobile implement frame having front and rear ends and attachable at its front end to the implement connecting means; a material container mounted on the frame having an elongated body portion of U-shaped cross section including transversely spaced side walls and opposite end walls closing the ends of the body portion; longitudinally extending shaft means located between the side walls and extending between the end walls including a plurality of axially alined shafts positioned end to end; structure on the body portion rotatably supporting the shafts; drive means connected to said power take-off shaft adjacent one of said end walls effecting rotation of the shafts; and control mechanism for said drive means selectively adaptable to effect rotation of one or all of said shafts; and extensible arm means axially spaced on the plurality of shafts effective upon rotation of the shafts to discharge material over at least one of the side walls.

References Cited in the file of this patent

UNITED STATES PATENTS

| | | |
|---|---|---|
| 896,178 | Tuttle | Aug. 18, 1908 |
| 2,050,120 | Pizarro | Aug. 4, 1936 |
| 2,139,080 | Heer | Dec. 6, 1938 |
| 2,558,352 | Gandrud | June 26, 1951 |
| 2,828,130 | Hill | Mar. 25, 1958 |
| 2,886,332 | Elwick | May 12, 1959 |